United States Patent
Roos et al.

(10) Patent No.: US 8,686,612 B2
(45) Date of Patent: Apr. 1, 2014

(54) BRUSH ARRANGEMENT FOR ELECTRICAL MACHINE

(75) Inventors: Gerald Roos, Achern (DE); Pierre Bernard, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 66 days.

(21) Appl. No.: 13/320,592

(22) PCT Filed: Mar. 19, 2010

(86) PCT No.: PCT/EP2010/053589
§ 371 (c)(1),
(2), (4) Date: Feb. 13, 2012

(87) PCT Pub. No.: WO2010/130488
PCT Pub. Date: Nov. 18, 2010

(65) Prior Publication Data
US 2012/0133240 A1    May 31, 2012

(30) Foreign Application Priority Data
May 15, 2009   (DE) .......................... 10 2009 003 159

(51) Int. Cl.
*H01R 39/18*   (2006.01)
(52) U.S. Cl.
USPC ......................................... 310/233; 310/248
(58) Field of Classification Search
USPC .......... 310/224, 229, 230, 233, 234, 241, 248
See application file for complete search history.

(56) References Cited

U.S. PATENT DOCUMENTS

| | | | | |
|---|---|---|---|---|
| 4,292,559 A | * | 9/1981 | Auinger et al. | 310/206 |
| 4,532,449 A | | 7/1985 | Aoki | |
| 2002/0008430 A1 | * | 1/2002 | Tanaka et al. | 310/68 C |
| 2009/0309451 A1 | * | 12/2009 | Roos | 310/179 |

FOREIGN PATENT DOCUMENTS

| | | | |
|---|---|---|---|
| DE | 69513655 | 6/2000 | |
| EP | 0395515 | 10/1990 | |
| JP | 55125069 | 9/1980 | |
| JP | 62181651 | 8/1987 | |
| JP | 63302751 | 12/1988 | |
| JP | 03112350 A * | 5/1991 | H02K 23/32 |
| WO | 95/32543 | 11/1995 | |

OTHER PUBLICATIONS

PCT/EP2010/053589 International Search Report dated May 28, 2010 (2 pages).

* cited by examiner

*Primary Examiner* — Tran Nguyen
*Assistant Examiner* — Naishadh Desai
(74) *Attorney, Agent, or Firm* — Michael Best & Friedrich LLP

(57) ABSTRACT

An electrical machine, in particular an electric motor, has a first number (k) of commutator laminates (10, 12, 14) and brushes (16, 18), wherein the commutator laminates (10, 12, 14) are arranged distributed uniformly in the circumferential direction of a circumference of a laminate support (24). The brushes (16, 18) are arranged such that commutation times are distributed as uniformly as possible in order to reduce current ripple when using a wave winding and a number of brushes (16, 18) which is less than a number of poles (2*p*) in the electrical machine.

17 Claims, 4 Drawing Sheets

BRUSH ARRANGEMENT FOR ELECTRICAL MACHINE

BACKGROUND OF THE INVENTION

The invention relates to an electrical machine, in particular an electric motor wherein the electrical machine has a first number of commutator laminates and brushes, wherein the commutator laminates are arranged distributed uniformly in the circumferential direction on a circumference of a laminate support.

DE 695 13 655 T2 describes two windshield wiper motors for two speeds in each case. One of the two motors has two poles and three brushes, with a high-speed brush being arranged offset through a circumferential angle of, for example 120° with respect to a common grounding brush. Here, the circumferential angle is chosen as a function of a desired ratio between a high speed and a low speed of the motor. The other motor has four poles and six brushes, with the high-speed brush being arranged offset through a circumferential angle of, for example, 60° with respect to the associated grounding brush, and with the circumferential angle also being chosen here as a function of the desired ratio between a high speed and a low speed of the motor. It has been found that the operation of such conventional motors can lead to high power losses in upstream electronics, to voltage fluctuations in a vehicle power supply system, and to electromagnetic interference (EMC problems). This is particularly the case when a wave winding is used, and the number of brushes is less than the number of poles.

SUMMARY OF THE INVENTION

The invention is based on the object of reducing power losses in upstream electronics, voltage fluctuations in the vehicle power supply system and electromagnetic interference.

The invention builds on an electrical machine of this generic type, in particular an electric motor, in that the brushes are arranged such that commutation times are distributed as uniformly as possible in order to reduce the current ripple when using a wave winding and a number of brushes which is less than the number of poles in the electrical machine.

One embodiment of the electrical machine provides that the brushes comprise a first brush pair, wherein a first circumferential angle $\alpha_1$ exists between a first radial axis of a first of the brushes in the first brush pair and a second radial axis of a second of the brushes in the first brush pair, the absolute magnitude abs ($\alpha_1$) of which first circumferential angle $\alpha_1$ differs from a brush nominal separation angle $\alpha_{nom}=(360°/2k)(2\cdot\text{floor}(U2\cdot(k/2p))+1)$ by no more than a tolerance angle $\alpha_T$, where U2 is an odd natural number, abs ( ) is an absolute magnitude function, floor ( ) is an integer rounding function and $\alpha_T$ is a tolerance angle, which is less than 8°, in particular less than 4°, in particular less than 2°, in particular less than 1°.

In one development of the electrical machine, abs(abs($\alpha_1$)−$\alpha_P$·U2)>$\alpha_T$, where $\alpha_P$ is a pole pitch angle of the electrical machine.

In a likewise preferred embodiment of the electrical machine, a first absolute magnitude of a first difference from the first circumferential angle minus a first product of half of the laminate pitch angle of the electrical machine with a first odd natural number is less than a tolerance angle, wherein the first odd natural number is equal to one plus twice a third product, rounded to an integer of a second odd natural number multiplied by a quotient of a pole pitch angle of the electrical machine divided by the laminate pitch angle, wherein a second absolute magnitude of a second difference from the first circumferential angle minus a second product from the pole pitch angle of the electrical machine multiplied by the second odd natural number is greater than the tolerance angle, wherein the tolerance angle is less than 8°, in particular less than 4°, in particular less than 2°, in particular less than 1°.

One preferred embodiment provides that a half of the second odd natural number rounded to an integer is less than or equal to a quarter of the number of poles rounded to an integer.

In one advantageous embodiment, the first difference is positive or negative.

A likewise preferred embodiment provides that twice the first quotient is not a natural number.

One preferred development provides that the number of poles is less than 11, in particular less than 9, in particular less than 7.

Preferably, the number of commutator laminates is less than 27, in particular less than 25, in particular less than 23, in particular less than 21, in particular less than 19, in particular less than 17, in particular less than 15.

The electrical machine can be designed such that the second odd natural number is less than 10, in particular less than 8, in particular less than 6, in particular less than 4, in particular less than 2.

A further embodiment provides that the first odd natural number is equal to five and the second odd natural number is equal to one, in particular with the first product being equal to 64.3° or equal to 34.6°.

In addition, an electrical machine is preferred in which a rotor and/or a stator of the electrical machine has a wave winding, in particular a simplex wave winding.

The electrical machine may be a servomotor or a wiper motor.

BRIEF DESCRIPTION OF THE DRAWINGS

The invention will now be explained using particularly preferred embodiments and with reference to the accompanying figures, in which.

DETAILED DESCRIPTION

Figure 1A:
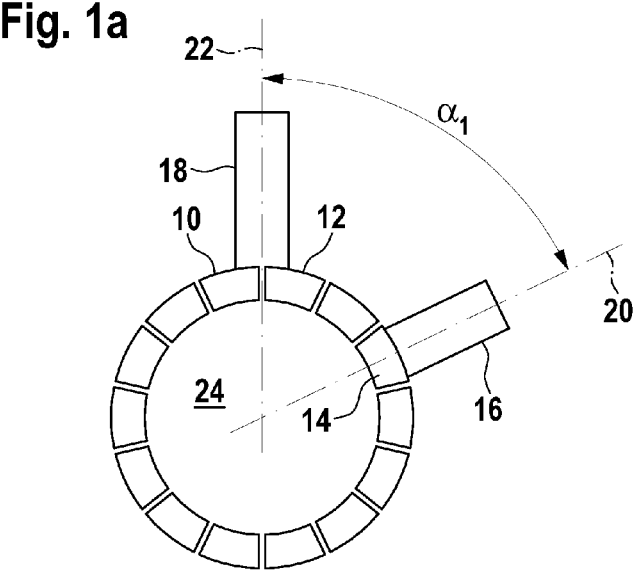
FIGS. 1a to 1c show a schematic illustration of a brush arrangement according to a first exemplary embodiment of the invention.
Figure 1B:
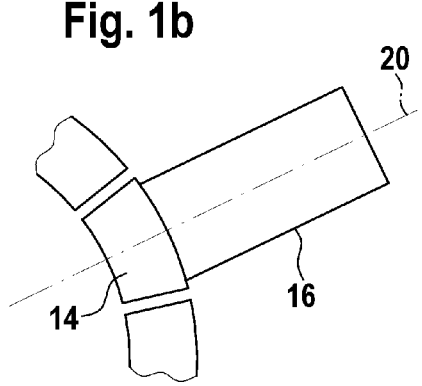
Figure 1C:
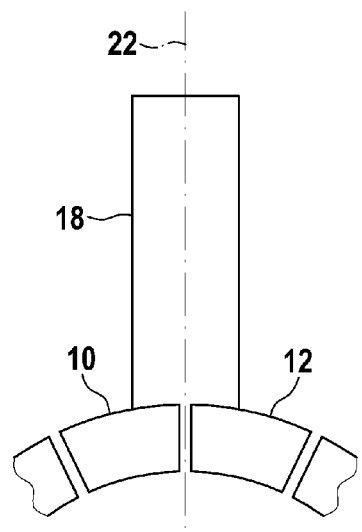

When using a wave winding, it is possible to choose a number of brushes less than the number of poles 2p without additional measures, with the characteristic of the electrical machine being changed only slightly. In the brush arrangement shown in FIG. 1a for a retrogressive simplex wave winding for a 6-pole motor with 14 commutator laminates 10, 12, 14 and two brushes 16, 18, a first circumferential angle $\alpha_1$ between a first radial axis 20 of the first brush 16 and a second radial axis 22 of the second brush 18 is approximately 64.3°. The second brush 18 is positioned symmetrically with respect to two commutator laminates 10, 12 (see FIG. 1c) when the rotor 24 assumes a rotor position 26 (see FIG. 3) where the first brush 16 is positioned centrally on a third commutator laminate 14 (see FIG. 1b). The term "laminate" is also used instead of "commutator laminate" in the following text. It is frequently expedient to arrange two brushes 16, 18 at as small an angle $\alpha_1$ with respect to one another as possible, in order to save space.

Figure 2A:
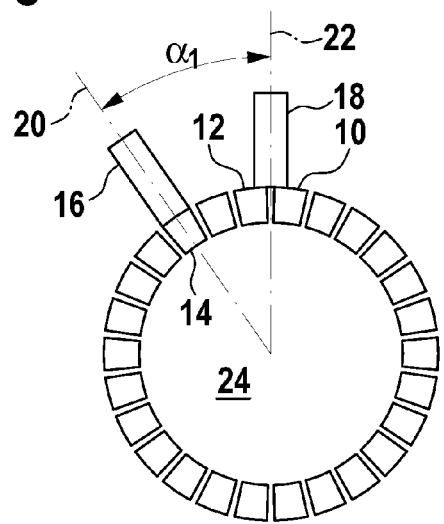
FIGS. 2a to 2c show a schematic illustration of a brush arrangement according to a second exemplary embodiment of the invention.
Figure 2B:
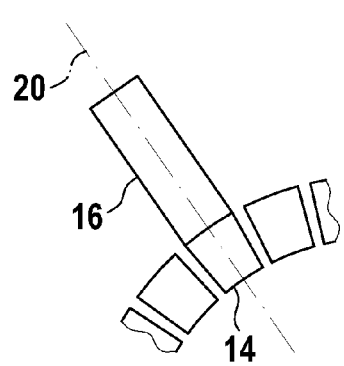
Figure 2C:
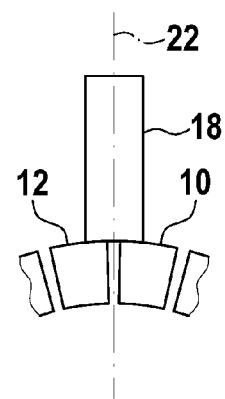

In the brush arrangement shown in FIG. 2 for a retrogressive simplex wave winding for a 10-pole motor with 26 commutator laminates 10, 12, 14 and two brushes 16, 18, a first circumferential angle $\alpha_1$ between a first radial axis 20 to the first brush 16 and a second radial axis 22 of the second brush 18 is approximately 34.6°. The second brush 18 is positioned symmetrically with respect to two commutator laminates 10, 12 (see FIG. 4c) when the rotor 24 assumes a rotor position 26 (see FIG. 3) where the first brush 16 is positioned centrally on a third commutator laminate 14 (see FIG. 4b).

Table 1 contains an overview of features of the embodiments illustrated in FIGS. 1 and 2, with the column "No" containing the order number of the embodiment, the column "k" containing the number of commutator laminates k, the column "2p" containing the number of poles 2p, the column "U2" containing the second odd natural number U2, the column "$\alpha_K/2$" containing half $\alpha_K/2$ of the laminate pitch angle $\alpha_K$, the column "Q1" containing the first quotient Q1, the column "U1" containing the first odd natural number U1 and the column "$\alpha_{nom}$" containing the brush nominal separation angle $\alpha_{nom}$.

TABLE 1

| No | k | 2p | U2 | $\alpha_K/2 =$ 360°/2k | Q1 = k/2p | U1 | $\alpha_{nom}=$ U1 * $\alpha_K/2$ |
|---|---|---|---|---|---|---|---|
| 1 | 14 | 6 | 1 | 12.86° | 2.33 | 5 | 64.3° |
| 2 | 26 | 10 | 1 | 6.92° | 2.60 | 5 | 34.6° |

For further embodiments, that is to say for other triple sets of the number of laminates k, the number of poles 2p and the second odd natural number U2, the brush nominal separation angle $\alpha_{nom}$ can be determined as follows: $\alpha_{nom}=U1*\alpha_K/2$ where $U1:=2[U2*Q1]+1=1+2*P3$ where $P3:=[U2*Q1]$, with the square parentheses representing the rounding function (that is to say the rounding or integer function). Half $\alpha_K/2$ the laminate pitch angle $\alpha_K$ is equal to the complete angle 360° divided by twice 2k the number of laminates k. The quotient Q1 is equal to a pole pitch angle $\alpha_P=360°/2p$ of the electrical machine divided by the laminate pitch angle $\alpha_K=360°/k$, and is also equal to the number of laminates k divided by the number of poles 2p. The first odd natural number U1 is equal to one plus twice 2[P3] a third product P3 rounded to an integer [P3], from the odd natural number U2 multiplied by the quotient Q1.

Figure 3:
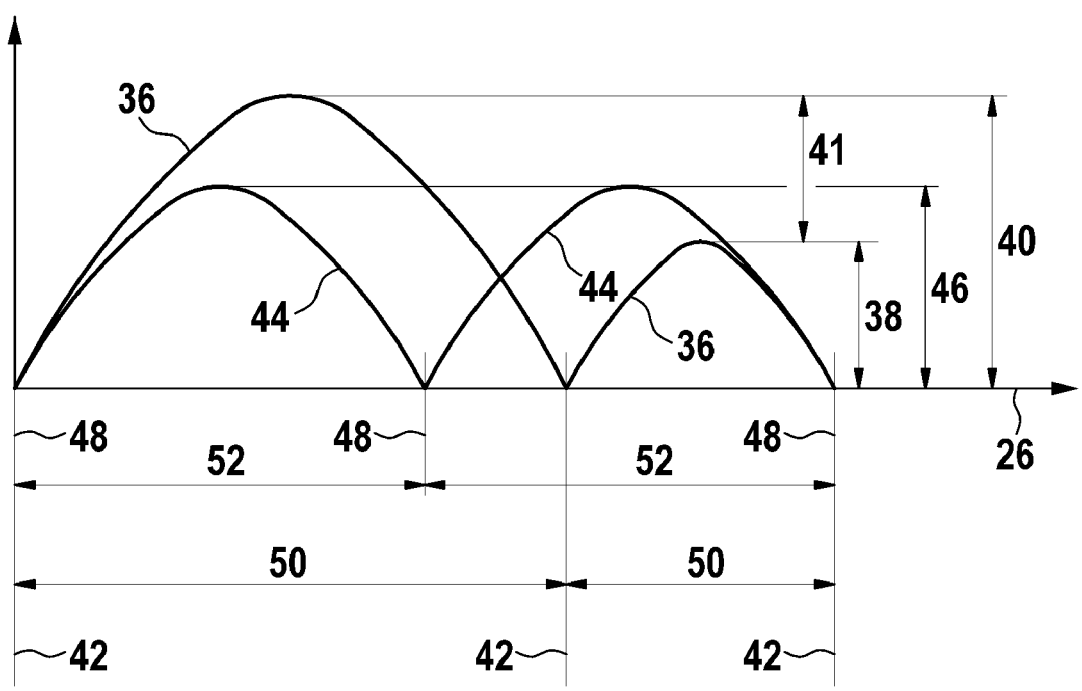
FIG. 3 shows a schematic illustration of an undesirable non-uniformly distributed current profile as a function of a rotor position and a desired uniformly distributed current profile as a function of the rotor position.

The following text explains why the electrical machine according to the invention reduces power losses in upstream electronics, voltage fluctuations in the vehicle power supply system, and electromagnetic interference. FIG. 3 shows a current profile 36 plotted against the rotor position 26, as can be measured on the supply lines of a conventional electrical machine. The current profile 36 is periodic, but has amplitudes 38, 40 of different magnitude. The amplitudes 38, 40, and in particular the fluctuations 41 thereof as well, are a measure of current ripple. The greater the current ripple, the greater are the power losses in upstream electronics, voltage fluctuations in the local power supply system, and electromagnetic interference. The high current ripple in the conventional electrical machine may be caused by a non-uniform distribution 50 of the commutation positions 42 or times 42. In contrast, the current profile 44 of an electrical machine according to the invention does not have such severe fluctuations 41 in the amplitude 46. That is to say the current ripple is considerably less than in the case of the conventional electrical machine. The technical reason for this is the more uniform distribution 52 of the brushes 16, 18, 28, 30 with respect to the laminate pitch of the commutator. That is to say, according to the invention, the current ripple is reduced by distributing the commutation positions 48 or times 48 uniformly (or at least more uniformly) done in conventional electrical machines. The brushes 16, 18 in a brush pair 16, 18 are arranged optimally with respect to the current ripple when the two brushes 16, 18 commutate alternately, symmetrically in time with respect to one another. This condition is satisfied when the two brushes 16, 18 are arranged geometrically symmetrically alternating with one another with respect to the laminate arrangement. This is the case when an adjacent pair 10, 12 of two laminates 10, 12 is arranged centrally under the radial axis 22 of the second brush 18, when a third laminate 14 is arranged centrally under the radial axis 20 of the first brush 16. The brush arrangement according to the invention is based on the approach of associating an odd natural number U1 of half $\alpha_K/2$ the laminate pitch angles $\alpha_K$ with a brush nominal separation angle $\alpha_{nom}$. The brush nominal separation angle $\alpha_{nom}$ is therefore equal to a commutation step plus or minus half $\alpha_K/2$ the laminate pitch angle $\alpha_K$.

Table 2 contains an overview of features of two conventional embodiments which correspond to the first and second embodiments according to the invention, with the column "No" containing the order number of the embodiment, the column "2p" containing the number of poles 2p, the column "$\alpha_P$" containing the pole pitch angle $\alpha_P$, the column "U2" containing the second odd natural number U2, and the column "$\alpha_{conv}$" containing a conventional brush nominal separation angle $\alpha_{conv}$.

TABLE 2

| No | 2p | $\alpha_P =$ 360°/2p | U2 | $\alpha_{conv}=$ U2 * $\alpha_P$ |
|---|---|---|---|---|
| 1 | 6 | 60° | 1 | 60° |
| 2 | 10 | 36° | 1 | 36° |

The conventional brush nominal separation angle $\alpha_{conv}$ for further corresponding embodiments, that is to say for different two-tuples of the number of poles 2p and the second odd natural number U2, can be calculated as follows: $\alpha_{conv}=U2*\alpha_P$. The conventional brush nominal separation angle $\alpha_{conv}$ is therefore equal to a second product of the pole pitch angle $\alpha_P$ of the electrical machine multiplied by the second odd natural number U2. The conventional brush arrangement is based on the idea of associating an integer number of pole pitches $\alpha_P$ with one commutation step.

Figure 4A:
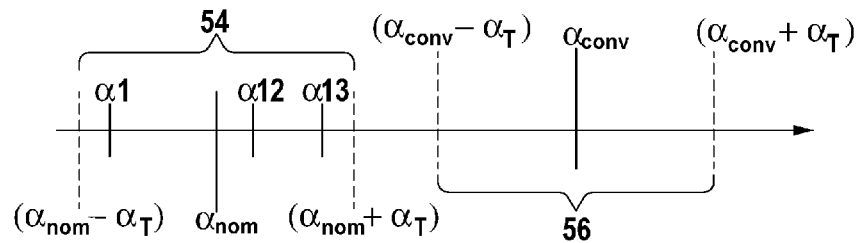
FIGS. 4a to 4c show schematic illustrations of three possible arrangements of angle tolerance ranges of a brush arrangement according to the invention, related to a conventional brush arrangement.
Figure 4B:
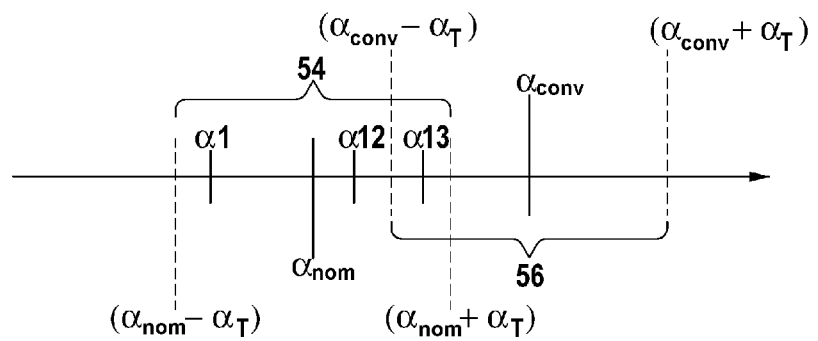
Figure 4C:
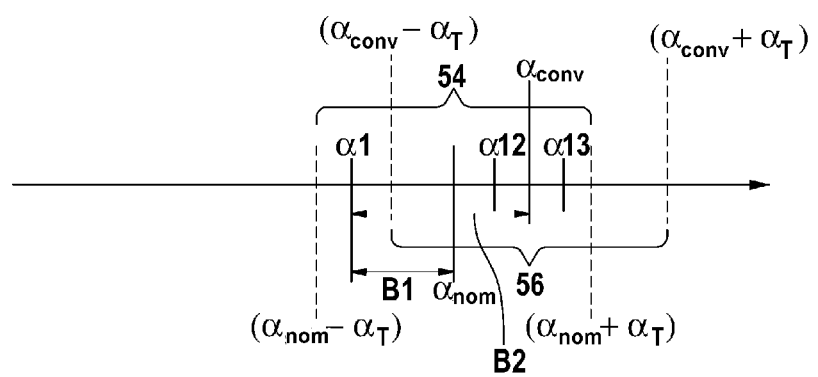

FIG. 4a shows a first angle tolerance range 54 for a brush arrangement according to the invention which does not overlap a second angle tolerance range 56 of a corresponding conventional brush arrangement. In this case, all the brush arrangements $\alpha_{11}$, $\alpha_{12}$, $\alpha_{13}$ within the first angle tolerance range 54 represent a new brush arrangement $\alpha_{11}$, $\alpha_{12}$, $\alpha_{13}$. FIG. 4b shows a second angle tolerance range 56 for a conventional brush arrangement, which overlaps a part of the first angle tolerance range 54, but not the brush nominal separation angle $\alpha_{nom}$. In this case, the only brush arrangements $\alpha_{11}$, $\alpha_{12}$ which represent a new brush arrangement $\alpha_{11}$, $\alpha_{12}$ are those which are within the first angle tolerance range 54 and outside the second angle tolerance range 56. FIG. 4c shows a second angle tolerance range 56 for a conventional brush arrangement, which overlaps a part of the first angle tolerance range 54 and in this case also the brush nominal separation angle $\alpha_{nom}$ as well. In this case as well, the only brush arrangements $\alpha_{11}$ which form a new brush arrangement $\alpha_{11}$ are those which are both within the first angle tolerance range 54 and outside the second angle tolerance range 56. In the brush arrangement according to the invention, a first absolute magnitude B1 of a first difference D1 from the first circumferential angle $\alpha_1$ minus the brush nominal separation angle $\alpha_{nom}$ is less than a tolerance angle $\alpha_T$. At the same time, a second absolute magnitude B2 of a second difference D2 from the first circumferential angle $\alpha_1$ minus a second product $\alpha_{conv}$ from the pole pitch angle $\alpha_P$ of the electrical machine multiplied by the second odd natural number U2 is greater than the tolerance angle $\alpha_T$. The tolerance angle $\alpha_T$ may be less than 8°, in particular less than 4°, in particular less than 2°, in particular less than 1°.

A person skilled in the art can use the above design rules, for example with the assistance of a table calculation program, to calculate a table which in each case indicates an angle tolerance range for the first circumferential angle $\alpha_1$ for a multiplicity of tuples of predetermined tolerance angle $\alpha_T$, number of laminates k, number of poles 2p, second odd natural number U2 and pole pitch angle $\alpha_P$. In order to dispense with the attachment of a comprehensive tabular overview, for economic reasons, the following is noted. Particularly for the case of a so-called "random removal", all the angle tolerance ranges which can be calculated by means of the above design rules are considered to be disclosed not only in their totality, but each individual one of the angle tolerance ranges which can be calculated in this way is also (at least implicitly) considered to have been disclosed in its own right.

The load on the electrical machine may be mechanical, while the drive is electrical (motor operation). Alternatively or additionally, the electrical machine can be driven mechanically, while the load on the electrical machine is electrical (generator operation).

The invention claimed is:

1. An electrical machine, wherein the electrical machine has a first number (k) of commutator laminates (10, 12, 14) and brushes (16, 18), wherein the commutator laminates (10, 12, 14) are distributed uniformly in a circumferential direction on a circumference of a laminate support (24), characterized in that the brushes (16, 18) are arranged such that commutation times are distributed as uniformly as possible in order to reduce the current ripple when using a wave winding and a quantity of the brushes (16, 18) is less than the number of poles (2p) in the electrical machine; wherein the brushes (16, 18) comprise a first brush pair (16, 18), wherein a first circumferential angle $\alpha_1$ exists between a first radial axis (20) of a first (16) of the brushes (16, 18) in the first brush pair (16, 18) and a second radial axis (22) of a second (18) of the brushes (16, 18) in the first brush pair (16, 18), the absolute magnitude abs ($\alpha_1$) of which first circumferential angle $\alpha_1$ differs from a brush nominal separation angle $$\alpha_{nom}=(360°/2k)(2\cdot\mathrm{floor}(U2\cdot(k/2p))+1)$$

by no more than a tolerance angle $\alpha_T$, where U2 is an odd natural number, abs ( ) is an absolute value function, floor ( ) is an integer rounding function and $\alpha_T$ is a tolerance angle, which is less than 8°.

2. The electrical machine as claimed in claim 1, characterized in that $$abs(abs(\alpha_1)-\alpha_P\cdot U2)>\alpha_T$$

where $\alpha_P$ is a pole pitch angle of the electrical machine.

3. The electrical machine as claimed in claim 1, wherein the electrical machine has a first number (k) of commutator laminates (10, 12, 14) and a brush pair (16, 18), wherein the commutator laminates (10, 12, 14) are arranged uniformly in the circumferential direction on a circumference of a laminate support (24), having a first circumferential angle ($\alpha_1$) between a first radial axis (20) of a first (16) of the brushes (16, 18) and a second radial axis (22) of a second (18) of the brushes (16, 18), characterized in that a first absolute magnitude (B1) of a first difference (D1) from the first circumferential angle ($\alpha_1$) minus a first product ($\alpha_{nom}$) of half ($\alpha_K/2$) of the laminate pitch angle ($\alpha_K$) of the electrical machine with a first odd natural number (U1) is less than a tolerance angle ($\alpha_T$), wherein a first odd natural number (U1) is equal to one plus twice (2[P3]) a third product (P3), rounded to an integer ([P3]) of a second odd natural number (U2) multiplied by a quotient (Q1) of a pole pitch angle ($\alpha_P$) of the electrical machine divided by the laminate pitch angle ($\alpha_K$), wherein a second absolute magnitude (B2) of a second difference (D2) from the first circumferential angle ($\alpha_1$) minus a second product ($\alpha_{conv}$) from the pole pitch angle ($\alpha_P$) of the electrical machine multiplied by the second odd natural number (U2) is greater than the tolerance angle ($\alpha_T$), wherein the tolerance angle ($\alpha_T$) is less than 8°.

4. The electrical machine as claimed in claim 1, characterized in that a half (U2/2) of the second odd natural number (U2) rounded to an integer ([U2/2]+(½)]) is less than or equal to a quarter (p/2) of the number of poles (2p) rounded to an integer ([(p/2)+(½)]).

5. The electrical machine as claimed in claim 3, characterized in that the first difference (D1) is positive or negative.

6. The electrical machine as claimed in claim 3, characterized in that twice (2Q1) the first quotient (Q1) is not a natural number.

7. The electrical machine as claimed in claim 1, characterized in that the number of poles (2p) is less than 11.

8. The electrical machine as claimed in one claim 1, characterized in that the number of commutator laminates (k) is less than 27.

9. The electrical machine as claimed in claim 1, characterized in that the second odd natural number (U2) is less than 10.

10. The electrical machine as claimed in claim 3, characterized in that the first odd natural number (U1) is equal to five and the second odd natural number (U2) is equal to one.

11. The electrical machine as claimed in claim 1, characterized in that a rotor (24) of the electrical machine has a wave winding.

12. The electrical machine as claimed in claim 1, characterized in that the electrical machine is a servomotor or a wiper motor.

13. The electrical machine as claimed in claim 10, characterized in that the first product ($\alpha_{nom}$) is equal to 64.3°.

14. The electrical machine as claimed in claim 10, characterized in that the first product ($\alpha_{nom}$) is equal to 34.6°.

15. The electrical machine as claimed in claim 1, characterized in that a stator of the electrical machine has a wave winding.

16. The electrical machine as claimed in claim 15, characterized in that the wave winding is a simplex wave winding.

17. The electrical machine as claimed in claim 11, characterized in that the wave winding is a simplex wave winding.

\* \* \* \* \*

UNITED STATES PATENT AND TRADEMARK OFFICE
CERTIFICATE OF CORRECTION

PATENT NO. : 8,686,612 B2  
APPLICATION NO. : 13/320592  
DATED : April 1, 2014  
INVENTOR(S) : Roos et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 94 days.

Signed and Sealed this

Twenty-ninth Day of September, 2015

Michelle K. Lee
*Director of the United States Patent and Trademark Office*